United States Patent [19]
Scheckenbach et al.

[11] Patent Number: 6,025,440
[45] Date of Patent: Feb. 15, 2000

[54] MIXTURE OF FLUOROPOLYMERS, OXIDIZED POLYARYLENE SULFIDES AND POLYARYLENE, SULFIDES

[75] Inventors: Helmut Scheckenbach, Langen; Gregor Büche, Heidenheim, both of Germany

[73] Assignee: Hoechst Aktiengesellschaft, Germany

[21] Appl. No.: 08/993,161

[22] Filed: Dec. 18, 1997

[30] Foreign Application Priority Data

Dec. 23, 1996 [DE] Germany ............................ 196 54 102

[51] Int. Cl.$^7$ .............................. C08L 27/12; C08L 81/00
[52] U.S. Cl. .......................... 525/189; 525/199; 525/535; 525/537; 525/906; 524/502; 524/520; 524/545; 524/546

[58] Field of Search ...................................... 525/189, 199, 525/535, 537, 906; 524/520, 502, 545, 546

[56] References Cited

U.S. PATENT DOCUMENTS 5,721,282  2/1998  Schonfeld et al. .................. 521/51

*Primary Examiner*—Mark L Warzel
*Attorney, Agent, or Firm*—Connolly Bove Lodge & Hutz

[57] ABSTRACT

A blend of at least one fluorine polymer, at least one oxidized polyarylene sulfide, at least one polyarylene sulfide and, if required, conventional additives results in a reduction in the expulsion of the oxidized polyarylene sulfides in gaseous form in the production of shaped articles from this blend, so that no cracks occur in the shaped article and problem-free processing by a cutting method is permitted.

12 Claims, No Drawings

MIXTURE OF FLUOROPOLYMERS, OXIDIZED POLYARYLENE SULFIDES AND POLYARYLENE, SULFIDES

The invention relates to blends of fluorine polymers, oxidized polyarylene sulfides and polyarylene sulfides and their use for the production of shaped plastic articles.

Blends of fluorine polymers with oxidized polyarylene sulfides are known (DE 43 23 181, DE 43 23 121) to be advantageous. Oxidized polyarylene sulfides are to be understood as meaning completely or partially oxidized polyarylene sulfides, i.e. polyarylene sulfides or compounds which also contain SO and/or $SO_2$ bridge members in addition to S bridge members in the molecular chain. These compounds are random copolymers. A disadvantage of these blends is that processing problems occur with increasing proportion by weight of oxidized polyarylene sulfides in the blends or in the production of components having a large volume. In particular, the oxidized polyarylene sulfides are expelled in gaseous form, leading to cracks in the component.

It is the object of the invention to avoid the stated disadvantages.

The invention relates to a polymer blend comprising
A) at least one fluorine polymer in an amount of from 0.5 to 99% by weight,
B) at least one oxidized polyarylene sulfide in an amount of from 0.5 to 99% by weight,
C) at least one polyarylene sulfide in an amount of from 0.1 to 10% by weight and
D) if required, conventional additives,
the sum of the components A) to C) always being 100% by weight.

The invention also relates to the use of the shaped articles produced therefrom.

It has been found that the addition of small amounts of polyarylene sulfides to blends of fluorine polymers and oxidized polyarylene sulfides reduces the expulsion of the oxidized polyarylene sulfides in gaseous form and consequently the shaped articles produced do not crack.

Fluorine polymers A) are taken to mean polymers which contain at least one fluorine atom. These are well known and are described, for example, in Ullmann's Encyclopedia of Industrial Chemistry, 5th edition, VCH Verlagsgesellschaft mbH, Weinheim-New York 1992: Organische Fluorpolymere [Organic Fluorine Polymers], Volume A11, pages 393–430, which is hereby incorporated by reference. Polytetrafluoroethylene and copolymers of tetrafluoroethylene and perfluoroalkoxy units in an amount of <5%, preferably ≦1%, i.e. so-called modified PTFE, are preferred.

Polyarylene sulfides C) and their preparation are described in Ullmann's Encyclopedia of Industrial Chemistry, Volume A21, B. Elvers, S. Hawkins and G. Schulz (Eds.), VCH Verlagsgesellschaft mbH, Weinheim-New York 1992, pages 463–472, which is hereby incorporated by reference. Polyphenylene sulfide is preferred.

Oxidized polyarylene sulfides B) are linear and branched polyarylene sulfides, some or all of whose sulfur groups have been converted into sulfoxide and/or sulfonyl groups. The synthesis of polyarylene sulfides containing sulfonyl groups is described in Chimia 28(9), (1974), 567. Oxidized polyarylene sulfides and their preparation are described, for example, in German Patent Applications DE 43 14 737 and DE 43 14 738, which are hereby incorporated by reference. The oxidized polyarylene sulfides are, for example, polyarylene sulfones, polyarylene sulfide sulfoxide sulfones, polyarylene sulfoxide sulfones and polyarylene sulfide sulfones. Oxidized polyarylene sulfides in which at least 10%, preferably at least 30% and in particular at least 60% of the sulfur bridges have been converted into sulfonyl bridges are suitable.

The mean particle size of the oxidized polyarylene sulfides B) as well as of the polyarylene sulfides C) is in general in the range from 0.3 to 500 μm, preferably from 1 to 100 μm and in particular from 5 to 50 μm.

It is advantageous if, before being mixed with the other components, the oxidized polyarylene sulfide B) used and the polyarylene sulfide C) are heated, if necessary under nitrogen, in order to remove readily volatile fractions from the substances. A temperature range of from 300 to 450° C., preferably from 260 to 420° C., and a heating time of from 15 minutes to 24 hours, preferably from 30 minutes to 6 hours, are advisable for components B) and a temperature from 150 to 200° C. and a time from 1 hour to 5 hours are advisable for component C).

The polymer blends according to the invention may contain conventional additives D), such as heat stabilizers, UV stabilizers, antistatic agents, flameproofing agents, dyes, pigments, inorganic and or organic fillers and lubricant additives, such as molybdenum sulfide or graphite.

The amount of fluorine polymers is from 0.5 to 99% by weight, preferably from 10 to 98% by weight and in particular from 30 to 95% by weight; the amount of oxidized polyarylene sulfides is from 0.5 to 99% by weight, preferably from 2 to 90% by weight, and in particular from 5 to 70% by weight; the amount of polyarylene sulfides is from 0.1 to 10% by weight, preferably from 1 to 10% by weight, and in particular from 2 to 7.5% by weight, the amounts of the individual components of the blend summing to 100%, based on the total polymer blend A) to C).

The preparation and processing of the blends according to the invention are dependent on the processibility of the fluorine polymers used. If these can be processed by a thermoplastic method, the blends are processed, for example, by kneading, blow molding, extruding, hot press molding or injection molding. If, on the other hand, they cannot be processed by a thermoplastic method, standard methods such as transfer molding, ram extrusion, hot press molding or cold press molding with a subsequent sinter process are used.

Shaped articles, films, fibers and peel films produced from blends according to the invention are suitable, for example, as bearing materials and seals since they have low abrasion, little tendency to creep and very high resistance to chemicals. They are increasingly being used in the semiconductor industry, for example as circuit boards, chip carriers and other shaped articles which have improved metallizability, good electrical properties and very good resistance to chemicals.

EXAMPLES

Example 1

Preparation of polyphenylene sulfone ($PPSO_2$)

63 kg of polyphenylene sulfide powder ($d_{50}$ value: 20μm) having a glass transition temperature (Tg) of 94° C. and a melting point (Tm) of 290° C. in 219 l of glacial acetic acid were taken at 50° C., 1.2 l of concentrated sulfuric acid were added and 91 kg of hydrogen peroxide (50%) were added dropwise over 3 hours, the temperature increasing to 60–65° C. After stirring had been carried out for a further 2 hours at 65° C., the reaction solution was cooled and the solid was filtered off under suction at 50° C., washed with water and dried. Yield: 70 kg, DSC data: Tg: 352° C., Tm: 520° C. (decomposition) Elemental analysis: $(C_6H_4SO_2)n$ C: 55.6%, H: 3.2%, S: 24.6%, 0:16.0%.

This corresponds to a degree of sulfur oxidation in the polymer of about 65%.

In Examples 2 to 5 below, this PPSO$_2$ from Example 1 and the following polymers were used:

®Fortron 0205 B4/20, i.e. a polyphenylene sulfide PPS (product form: powder having a mean particle diameter of about 20 μm) from Hoechst AG, Frankfurt a. M., Germany. Product properties and processing information are documented in the data sheet "Fortron" from Hoechst AG.

®Hostaflon TF 1750, a polytetrafluoroethylene PTFE (product form: powder) and Hostaflon TFM 1700, a modified polytetrafluoroethylene PTFE (product form: powder) from Hoechst AG, Frankfurt a.M., Germany. Product properties and processing information are documented in the data sheet "Hostaflon" from Hoechst AG.

Example 2

A mixture consisting of 70% by weight of PTFE (Hostaflon TF 1750), 25% by weight of PPSO$_2$ according to Example 1 and 5% by weight of PPS (Fortron 0205 B4120) was mixed for 12 minutes at room temperature in a commercial laboratory mixer which is suitable for mixing plastics powders.

Prior to mixing, the PPSO$_2$ was heated at 380° C. for 2 hours and the PPS at 170° C. for 3 hours.

3 kg of the blend were then subjected to hot press molding as follows:

The mold used was a hollow stainless steel cylinder having an internal diameter of 250 mm, a height of 100 mm and a wall thickness of 20 mm and brass disks as a ram. The gap between ram and hollow cylinder was <0.2 mm. Larger gaps are unsuitable. The blend was introduced into the hollow cylinder and the entire mold was then placed in a cold vacuum press and exposed to reduced pressure of 10 mbar for 1 minute. The mold filled with the blend was then exposed to a pressure of 6 N/cm2 and the temperature was increased to 300° C. at a heating rate of 2 K/min. This temperature was maintained for 2 hours. The pressure was then increased to 400 N/cm$^2$ and the temperature increased to 365° C. at a heating rate of 2 K/min. After a further hold time of 4 hours, the mold filled with the blend was cooled to 20° C. at a cooling rate of 1 K/min while maintaining the pressure of 400 N/cm$^2$. The mold was then brought to atmospheric pressure and the molding was removed from the mold.

The holding operation at 300° C. can be dispensed with in the case of small shaped articles.

The press is a so-alled "hot vacuum press" in which the total press space can be evacuated. The press plates are provided with heating cartridges and cooling channels. Cooling is carried out by means of compressed air. The reduced pressure has a fixed value of 10 mbar.

The heating and cooling rates and the reduced pressure are predetermined by the possibilities of the press. Variations with regard to the rates are possible within a wide range. It is also possible to use materials other than stainless steel and brass for the mold.

The blend obtained could be readily processed. No expulsion of gaseous fractions was observed. The molding obtained was free of cracks and could be further processed by a cutting method without problems.

Comparative Example 1

A blend consisting of 75% by weight of PTFE and 25% by weight of PPSO$_2$, in each case as in Example 2, was mixed and subjected to hot press molding under the same conditions as in Example 2.

The comparative blend expelled a considerable amount of gaseous fractions during the hot press molding procedure. The molding obtained had several cracks and could not be further processed by a cutting method.

Example 3

A mixture consisting of 70% by weight of modified PTFE (Hostaflon TFM 1700), 25% by weight of PPSO$_2$ from Example 1 and 5% by weight of PPS was mixed and subjected to hot press molding under the same conditions as in Example 2.

The mixture according to the invention could be readily processed. No expulsion of gaseous fractions was observed. The molding obtained was free of cracks and could be further processed by a cutting method without problems.

Comparative Example 2

A mixture consisting of 75% by weight of modified PTFE and 25% by weight of PPSO$_2$, in each case as in Example 3, was mixed and subjected to hot press molding under the same conditions as in Example 2.

Comparative mixture 2 expelled a considerable amount of gaseous fractions during the hot press molding procedure. The molding obtained had several cracks and could not be further processed by a cutting method.

Example 4

A mixture consisting of 30% by weight of PTFE (Hostaflon TF 1750), 65% by weight of PPSO$_2$ and 5% by weight of PPS, in each case as in Example 2, was mixed and subjected to hot press molding under the same conditions as in Example 2.

The mixture according to Example 4 could be readily processed. No expulsion of gaseous fractions was observed. The molding obtained was free of cracks and could be further processed by a cutting method without problems.

Comparative Example 3

A mixture consisting of 35% by weight of PTFE and 65% by weight of PPSO$_2$, in each case as in Example 4, was mixed and subjected to hot press molding under the same conditions as in Example 2.

The comparative blend expelled a considerable amount of gaseous fractions during the hot press molding procedure. The molding obtained had several cracks and could not be further processed by a cutting method.

Example 5

Example 2 was varied by using the following amounts: 74% by weight of PTFE, 25% by weight of PPSO$_2$ and 1% by weight of PPS, in each case as in Example 2.

The result was the same as that of Example 2.

We claim:

1. A polymer blend comprising
   A) at least one fluorine polymer in an amount of from 0.5 to 99% by weight,
   B) at least one oxidized polyarylene sulfide in an amount of from 0.5 to 99% by weight,
   C) at least one polyarylene sulfide in an amount of from 0.1 to 10% by weight and
   D) if required, conventional additives, the sum of the components A) to C) always being 100% by weight, and wherein component B) is selected from polyarylene sulfones, polyarylene sulfide sulfoxide sulfones, polyarylene sulfoxide sulfones and polyarylene sulfide sulfones, and wherein component B) is present in an amount such that during processing of the blend no expulsion of gaseous fractions occurs.

2. The polymer blend as claimed in claim 1, containing the component A) in an amount of from 10 to 98% by weight, the component B) in an amount of from 2 to 90% by weight, and the component C) in an amount of from 1 to 10% by weight.

3. The polymer blend as claimed in claim 1, containing the component A) in an amount of from 30 to 95% by weight, the component B) in an amount of from 5 to 70% by weight, and the component C) in an amount of from 2 to 7.5% by weight.

4. The polymer blend as claimed in claim 1, wherein the components B) and C) have a mean particle size of from 0.3 to 500 μm.

5. The polymer blend as claimed in claim 1, wherein the components B) and C) have a mean particle size of from 1 to 100 μm.

6. The polymer blend as claimed in claim 1, wherein said polyarylene sulfide C) is polyphenylene sulfide.

7. The polymer blend as claimed in claim 1, wherein at least 10% of the sulfide bridges of said oxidized polyarylene sulfide have been converted into sulfonyl bridges.

8. The polymer blend as claimed in claim 1, wherein at least 30% of the sulfide bridges of said oxidized polyarylene sulfide have been converted into sulfonyl bridges.

9. The polymer blend as claimed in claim 1, wherein at least 60% of the sulfide bridges of said oxidized polyarylene sulfide have been converted into sulfonyl bridges.

10. The polymer blend as claimed in claim 1, wherein said conventional additives D) are selected from the group consisting of heat stabilizers, UV stabilizers, antistatic agents, flameproofing agents, dyes, pigments, inorganic fillers, organic fillers and lubricant additives.

11. The polymer blend as claimed in claim 1 having a form selected from the group consisting of shaped articles, films, fibers and peel films.

12. The polymer blend as claimed in claim 11, wherein the form of said polymer blend is used for the production of bearing materials, seals, circuit boards, clip carriers and other shaped articles.

* * * * *

UNITED STATES PATENT AND TRADEMARK OFFICE
CERTIFICATE OF CORRECTION

PATENT NO. : 6,025,440
DATED : February 15, 2000
INVENTOR(S) : Helmut Scheckenbach et al.

It is certified that error appears in the above-identified patent and that said Letters Patent is hereby corrected as shown below:

Column 5, line 2 (claim 1, line 10), after "from" insert - - the group consisting of - -.

Signed and Sealed this

Twelfth Day of December, 2000

Attest:

Q. TODD DICKINSON

*Attesting Officer*   *Director of Patents and Trademarks*